Sept. 20, 1949.  J. W. INGLETON  2,482,343
SLIP FISHLINE SINKER
Filed April 2, 1946

INVENTOR.
James W. Ingleton
BY
Munn, Liddy, Glaccum & Rich
Attys.

Patented Sept. 20, 1949

2,482,343

UNITED STATES PATENT OFFICE 2,482,343

SLIP FISHLINE SINKER

James W. Ingleton, Astoria, Oreg.

Application April 2, 1946, Serial No. 659,027

3 Claims. (Cl. 43—52)

My present invention relates to sinkers for fishing lines of the variety known as slip sinkers, and it has for its object to provide one which may be readily applied to a line, at any desired position ahead of the lure, and is capable of being released when tension occurs on the line by a fish striking the lure or bait.

Another object of my invention is to provide a weight or sinker having at one end a line guide by which it is suspended when released and at its opposite end two elements for securing it in temporary fishing position, one being a pin or snubber around which the line passes and the other a friction clamp serving to hold the line on the snubber and from which the line is released when sufficient tension is applied thereto.

To these and other ends my invention embodies other improvements all of which will be fully described in the accompanying specification, the novel features thereof being set forth in the appended claims.

In the drawings.

Similar reference characters in the several figures indicate similar parts.

In trolling the sinker which is a relatively large mass should be placed at a considerable distance from the baited hook, spinning spoon, or other form of lure in order to prevent frightening the fish by the eddy currents created as the weight is dragged through the water. Since it is often desirable to regulate this distance and also to use sinkers of various weights according to the depth at which it is desired to do the fishing, it is desirable to provide means whereby they may be readily applied to and removed from the line, and also adjusted along its length and yet be readily releasable whereby when a fish takes the hook the sinker will slide down the line to the hooks or leader, so that the line may be reeled into the end of the fish pole.

Figure 1:
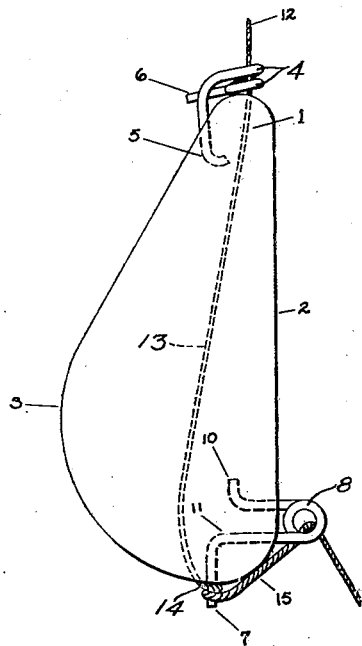
Figure 1 is a side view of a slip sinker embodying my invention.
Figure 3:
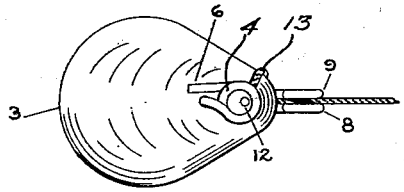
Figure 3 is a view looking downwardly on the upper or suspension end of the sinker, and, Figure 4 is a view showing the sinker in suspended position on a line.

In carrying out my invention I provide a weighted body having an upper end which is somewhat pointed, as indicated by 1, its top side, considered when in suspended or operative position, being a straight line, as indicated by 2, in Fig. 1. The bottom of the body is rounded so that its sides diverge to form a rounded bottom 3 (see Fig. 3) which is tapered toward the leading end 1. This particular shape I consider important as I have found in practice that it contributes to its smooth action in moving through the water at various depths. It also maintains an even tension on the fish line and its pointed shape and rounded bottom causes it to readily move through weeds and to readily pass underwater obstructions without fouling the line.

At the leading end 1 of the sinker I locate a line guide having a central aperture in alinement with the point thereon. This I form of two or more turns or spirals 4 of a spring wire, one end 5 of which is embedded in the weight when the latter is cast, the other extremity 6 thereof being extended to one side of the coil as a short tail, which is bent down close to the sinker, allowing only space enough for the line to pass beneath it. This prevents the line from being discharged accidentally by possible looping by the action of a fish when hooked. To this same end I place the spiral 4 at an angle to the axis of the sinker. This tail forms a convenient guide when twisting the line to thread it between the convolutions of the coil to bring the line into the center of the guide, as will be understood.

There are two cooperating members on the lower bulbous end of the sinker which cooperate with the line and by means of which the sinker is suspended in a parallel position on the fish line. One of these members is a pin 7 projecting from the end of the sinker in approximate alinement with the guide 4. The other member is a friction clamp located at the lower end of the straight side 2 of the body. Otherwise described it may be said that the line guide 6 is at one end of the body, and the pin 7 is at the other end thereof, while the line clamp extends laterally of the body. This clamping element I form of spring wire having adjacent convolutions 8 and 9, projecting from the side or edge 2 of the sinker, between which a bight of the line is inserted. In making these two members it is convenient to use a single piece of wire shaped as shown in Fig. 1 using a short end 10, extending from one loop of the coil and a longer end 11, the extremity of the latter forming the pin 7.

Figure 2:
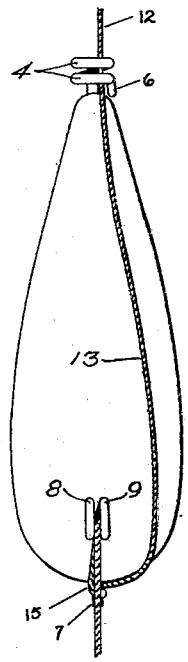
Figure 2 is a similar view representing the top of the sinker in the position it occupies when suspended on a fish line.
Figure 4:
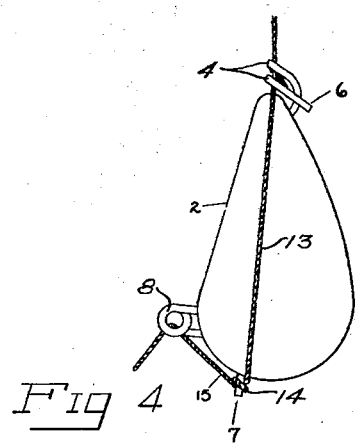

In Figs. 1, 2 and 4 I have indicated the manner in which a sinker embodying my invention is applied to a fish line. This is accomplished by first passing a portion of the leading end 12 of the line into the guide 4 and then carrying the trailing portion along one of the sides of the sinker, as indicated at 13, holding it in engagement with one of the sides of the friction clamp, thence passing it around the bulbous end of the sinker as indicated by 14, against whcih it is held by making one or more turns around the pin 7. From this point said trailing end of the line, which is being held taut, is extended rearwardly from pin 7, as indicated by 15, and pressed between the spring loops 8 and 9 and from this bight naturally trails off free in fishing position.

In wrapping the turns of the line around the pin 7 it will be seen that on the first turn the line lies close against the body of the sinker and that if successful turns are neatly laid they will form convolutions along the length of the pin. However, this is unimportant and additional turns of the line may be overlapping. Two turns are sufficient but more may be used, the last one serving to hold the others against the lower end of the sinker by reason of the line being carried rearwardly and retained by the clamp. When the line is released from the clamp the wrappings freely unwind off the pin, which, due to its shortness causes the lower end of the sinker to be free so that it is suspended beneath the then taut line.

It will be noticed that in wrapping the line around the pin 7 the portion 15 overlies the portion indicated by 14, so that if slack occurs in the leading portion 12 of the line this does not release the line from the pin 7. Likewise, it may be seen from Fig. 4 that the bight of the clamping member does not carry the weight of the sinker, this being sustained wholly by the pin 7 on the bottom of the sinker.

The described arrangement of parts is such that when a fish strikes the lure the line is snapped out of the bight of the clamping element and its windings stripped from the pin 7, thus freeing the sinker and allowing it to assume a pendulous position from the eye or guide 4 so that it is free to slide along the line to its far end.

Herein I have shown and described the preferred embodiment of my invention, however it is to be understood that changes in the construction of the sinker, or parts thereof, are possible within the scope of the appended claims.

What I claim and desire to secure by Letters Patent is:

1. A slip sinker comprising a weighted body provided with a pointed leading end and a bulbous lower end, a line guide eye at the pointed end of the body, and a friction line clamp extending laterally from the lower end of the body having adjacent spiral convolutions the ends of which are embedded in said body, one of said ends being extended and projecting beyond said body end to form a short straight pin located in substantial alinement with the line guide around which the line is wrapped before it is engaged with the clamp.

2. A fish line sinker comprising an elongated body having at one end thereof a coil, one end of which is embedded in the body, and a second coil on a side of the body having one end portion thereof embedded in the body and a second end portion thereof embedded in the body and extending exteriorly thereof, said second coil having its axis in a plane substantially at right angles to the axis of said first coil, said second coil providing a friction clamp laterally of said second end portion, whereby a line may be threaded through the first coil, wound around the projection and positioned in the clamp of the second coil.

3. A fish line sinker comprising an elongated body having at one end thereof a coil, one end of which is embedded in the body, and a second coil having a portion thereof embedded in the body, said portion having an end projecting outwardly from the bottom of the body, the second coil having its axis in a plane substantially at right angles to the axis of the first coil, said second coil providing a friction clamp laterally of said second end portion, whereby a line may be threaded through the first coil, wound around the projection and positioned in the clamp of the second coil.

JAMES W. INGLETON.

REFERENCES CITED

The following references are of record in the file of this patent:

UNITED STATES PATENTS

| Number | Name | Date |
|---|---|---|
| 360,418 | Clark | Apr. 5, 1887 |
| 2,111,958 | Bardon | Mar. 22, 1938 |
| 2,135,847 | Rosenquist | Nov. 8, 1938 |
| 2,399,298 | Sevegny | Apr. 30, 1946 |

FOREIGN PATENTS

| Number | Country | Date |
|---|---|---|
| 361,078 | Great Britain | Nov. 19, 1931 |